United States Patent Office 3,217,029
Patented Nov. 9, 1965

3,217,029
METHOD OF PREPARING SUBSTITUTED INDOLE DERIVATIVES
John Shavel, Jr., Mendham, and Maximilian von Strandtmann, Rockaway Township, N.J., assignors to Warner-Lambert Pharmaceutical Company, Morris Plains, N.J., a corporation of Delaware
No Drawing. Filed June 27, 1961, Ser. No. 119,830
2 Claims. (Cl. 260—471)

The present invention relates to a new and novel method of preparing compounds of the formula:

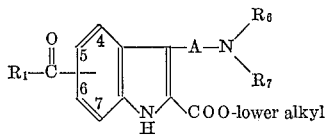

wherein the

substituent is at the 4, 5, 6 or 7 position and wherein $R_1$ is lower alkyl such as methyl, ethyl, isopropyl, isobutyl, n-butyl and the like, cycloalkyl such as cyclopentyl, cyclohexyl and cycloheptyl, a 5 or 6 membered heterocyclic aromatic radical containing sulfur, oxygen, or one to two nitrogen atoms in the ring such as radicals derived from pyrimidine, furan, pyrrole, thiophene, pyran, pyridine, and thiopyran, naphthyl, and radicals of the formula

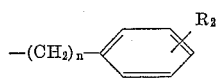

in which $n$ is 0 to 3 and $R_2$ which may be in the ortho, meta or para-position is phenyl, halogen, lower alkyl, trifluoromethyl, lower alkoxy, hydrogen, di-(lower alkyl) amino, cycloalkyl, nitro, benzoyl and the acyl radical of an aliphatic carboxylic acid containing 2 to 6 carbon atoms; A is a radical of the formula

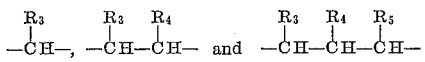

in which $R_3$, $R_4$ and $R_5$ are hydrogen, lower alkyl or

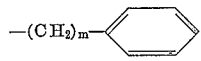

in which $m$ is 0 to 3; $R_6$ and $R_7$, which may be the same or different, are hydrogen, lower alkyl, cycloalkyl, lower alkyl substituted with a hydroxy, amino or lower alkoxy group, radicals of the formula

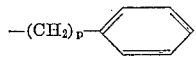

in which $p$ is 0 to 3, or when taken with the amino nitrogen atom from a piperidino, pyrrolidino or morpholino group, and when $R_6$ is hydrogen, $R_7$ may also be benzoyl or the acyl radical of an aliphatic carboxylic acid containing 2 to 6 carbon atoms. This invention also relates to new and novel intermediates obtained in the synthesis.

As used throughout the specification and in the claims, the terms "lower alkyl" and "lower alkoxy" refer to straight and branched chain aliphatic groups containing 1 to 6 carbon atoms; "cycloalkyl" refers to cyclic aliphatic groups containing 5 to 7 carbon atoms; and "halogen" refers to chlorine, fluorine or bromine.

The compounds of the above formula have interesting and significant pharmacological activity. They have a pronounced lowering effect upon blood pressure with an ability to increase coronary flow and also exhibit antiserotonin activity and depress the central nervous system. In addition, they are valuable chemical intermediates.

These compounds are described and claimed in the application of John Shavel, Jr., Maximilian von Strandtmann and Marvin P. Cohen entitled "Acylated Indole Derivatives" filed concurrently herewith and now U.S. Serial No. 119,831, filed June 27, 1961.

It has now been found that the compounds of the above formula may be prepared by the following reaction sequence:

First a keto ester of the formula

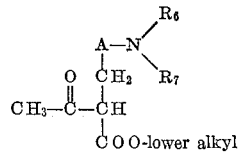

is coupled with a diazonium compound of the formula

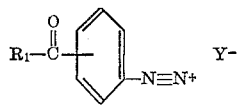

wherein Y is halogen or hydroxyl to form a hydrazone of the formula

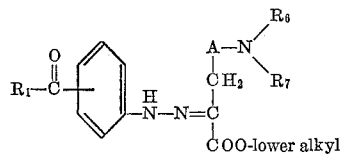

This reaction is normally carried out at a temperature of about 0° to about 15° C. and at a pH of about 6 to 7. Upon completion of the reaction, the mixture is made basic, extracted with an organic solvent such as chloroform and the hydrazone is recovered from the extract by distillation and is purified by crystallization.

Then the above hydrazone is heated with formic acid, or a mineral acid such as hydrochloric acid or polyphosphoric acid to form the desired compounds of the formula

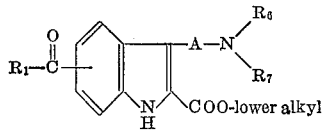

This reaction is normally carried out at a temperature between about 60° C. and about 120° C. Upon completion, the reaction mixture is poured into ice water, the mixture is basified and then is extracted with a solvent such as chloroform. Concentration of the extract followed by crystallization yields the desired product.

The keto ester starting materials may be prepared by the reaction of the sodium derivative of an acetoacetic ester having the formula

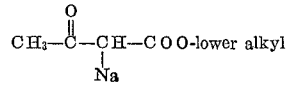

with a haloalkylamine of the formula

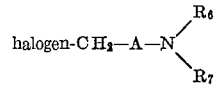

The following examples are included in order further to illustrate the invention:

EXAMPLE 1

*Ethyl α-keto-γ-dimethylaminobutyrate p-acetylphenylhydrazone*

To a solution of 40 g. p-aminoacetophenone in 250 ml. water and 143 ml. conc. HCl is added at 0–5° dropwise and with stirring a solution of 21 g. sodium nitrite in 200 ml. water. To the resulting solution of p-acetylphenyldiazonium chloride are added 60.3 g. ethyl α-(2-dimethylaminoethyl)acetoacetate followed by 63 g. sodium acetate. The pH is raised to 6–7 and maintained in this range by addition of 3 N sodium hydroxide. The mixture is stirred in the cold for two hours, basified and extracted with three 400 ml. portions of chloroform. The combined extracts are dried over sodium sulfate and concentrated in vacuo. The residue is crystallized from benzene-petroleum ether after purification with charcoal, M.P. 58–63°; yield: 65 g. (68%). Twofold recrystallization from petroleum ether yields pure ethyl α-keto-γ-dimethylaminobutyrate p-acetylphenylhydrazone, M.P. 78–80°.

*Analysis.*—Calc.: C, 62.93; H, 7.59; N, 13.76. Found: C, 63.19; H, 7.82; N, 14.00.

EXAMPLE 2

*5-acetyl-2-carbethoxygramine*

A mixture of 43 grams of ethyl α-keto-γ-dimethylaminobutyrate p-acetylphenylhydrazone and 430 g. polyphosphoric acid is heated with stirring. At 60–65° an exothermic reaction occurs. The temperature is gradually increased to 100–110° and maintained there for 2 hours and then poured into 700 ml. ice water. The aqueous mixture is stirred to complete solution, basified at low temperature with 3 N sodium hydroxide and extracted with three 400 ml. portions of chloroform. The combined extracts are dried over sodium sulfate and concentrated in vacuo. The residue is dissolved in ethyl acetate and treated with ethereal HCl. The precipitate is collected, washed with ether and dried in vacuo at 110°. Yield: 17.8 g. (39% of theory), M.P. 182–195°. Recrystallization from acetonitrile yields the pure hydrochloride of 5-acetyl-2-carbethoxygramine, M.P. 211–214°.

*Analysis.*—Calc.: C, 59.16; H, 6.52; N, 8.63. Found: C, 59.21; H, 6.82; N, 8.89.

Throughout the application, all temperatures are given in degrees centigrade.

It is understood that the foregoing detailed description is given merely by way of illustration and that many variations may be made therein without departing from the spirit of our invention.

Having described our invention, what we desire to secure by Letters Patent is:

1. Compounds of the formula:

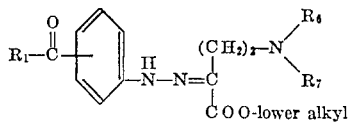

wherein $R_1$ is lower alkyl and $R_6$ and $R_7$ are members selected from the group consisting of hydrogen and lower alkyl.

2. Ethyl α-keto-γ-dimethylaminobutyrate p-acetylphenylhydrazone.

References Cited by the Examiner

UNITED STATES PATENTS

| | | | |
|---|---|---|---|
| 2,018,645 | 10/35 | Williams et al. | 260—566 |
| 2,189,383 | 2/40 | Ralston et al. | 260—684 |
| 2,833,810 | 5/58 | Kissman et al. | 260—471 |
| 2,852,527 | 9/58 | Steck | 260—319 |
| 2,852,553 | 9/58 | D'Amico et al. | 260—471 |
| 2,947,757 | 8/60 | Justoni et al. | 260—319 |
| 2,955,108 | 10/60 | Omietanski | 260—310 |

FOREIGN PATENTS

| | | |
|---|---|---|
| 63,836 | 2/61 | Australia. |
| 245,987 | 9/47 | Switzerland. |

OTHER REFERENCES

Hegedus: Helv. Chim. Acta., vol. 29, pp. 1499–1507 (1947).

Macholan et al.: Chem. Abstracts, vol. 50, p. 5573F (1956).

LEON ZITVER, *Primary Examiner.*

IRVING MARCUS, DUVAL T. McCLUTCHEN,
*Examiners.*